United States Patent [19]
Ries

[11] Patent Number: 5,710,469
[45] Date of Patent: Jan. 20, 1998

[54] MAGNETIC BEARING ELEMENT FOR A ROTOR SHAFT USING HIGH-$T_c$ SUPERCONDUCTING MATERIALS

[75] Inventor: Guenter Ries, Erlangen, Germany

[73] Assignee: Siemens Aktiengesellschaft, München, Germany

[21] Appl. No.: 354,295

[22] Filed: Dec. 13, 1994

[30] Foreign Application Priority Data

Dec. 13, 1993 [DE] Germany ............... 43 42 477.5
Oct. 14, 1994 [DE] Germany ............... 44 36 831.3

[51] Int. Cl.⁶ ........................................... H02K 7/09
[52] U.S. Cl. ............................... 310/90.5; 505/166
[58] Field of Search .................... 310/54, 61, 90.5; 505/166

[56] References Cited

U.S. PATENT DOCUMENTS

| | | | |
|---|---|---|---|
| 4,072,370 | 2/1978 | Wasson | 308/10 |
| 5,196,748 | 3/1993 | Rigney | 310/90.5 |
| 5,525,849 | 6/1996 | Ito et al. | 310/90.5 |
| 5,557,155 | 9/1996 | Hull | 310/90.5 |

FOREIGN PATENT DOCUMENTS

| | | |
|---|---|---|
| 38 25 710 | 5/1989 | Germany. |
| 37 44 143 | 7/1989 | Germany. |
| 5-10329 | 1/1993 | Japan. |
| 92/10871 | 6/1992 | WIPO. |

OTHER PUBLICATIONS

Appl. Phys. Lett., vol. 56, No. 4; 22 Jan. 1990, pp. 397–399; F.C. Moion et al.: High–speed rotation of magnets on high $T_c$ superconducting bearings.

Appl. Phys. Lett., vol. 53, No. 16, 1988, pp. 1554–1556, E.H. Brandt: Friction in levitated superconductors.

Transactions of the Cambridge Philosophical Society, vol. VIII, Part II, 1842, pp. 97–120.

Supercond. Sci. Technol., vol. 5, 1992, pp. 185–203: M. Murakami: processing of bulk YBaCuO.

Marinescu et al., Passive Axial Stabilizing of a Magnetic Radial Bearing by Superconductors, IEEE Transactions on Magnetics, pp. 3233–3235, Sep. 1989.

Bornemann et al., Concepts of Flywheels for Energy Storage Usiing Autostable High–Tc Superconducting Magnetic Bearings, Symposium on Magnetic Suspension Technology, pp. 1–15, Aug. 13.

Chen et al., Hybrid High Tc Superconducting Magnetic Bearings for Flywheel Applications, Proceeding of the Sixth U.S./Japan Workshop on High Tc Superconductors, pp. 1–6, Jan. 1994.

*Primary Examiner*—Clayton E. LaBalle
*Attorney, Agent, or Firm*—Kenyon & Kenyon

[57] ABSTRACT

A magnetic bearing element contains a first bearing part attached to a shaft and a second, fixed-position, bearing part surrounding the first bearing part. One of the bearing parts contains an arrangement of a plurality of alternately polarized permanent magnetic elements between which there are ferromagnetic elements and the other bearing part contains a superconducting structure. This superconducting structure should have grains made of high-$T_c$ superconducting material, whose respective grain size is larger than the thickness of each of the permanent magnetic elements. In addition, the rotor shaft should be made of a non-magnetic material. The rotor shaft may contain the bearing part with permanent magnetic elements or the structure with the high-$T_c$ superconducting material.

22 Claims, 4 Drawing Sheets

MAGNETIC BEARING ELEMENT FOR A ROTOR SHAFT USING HIGH-$T_C$ SUPERCONDUCTING MATERIALS

BACKGROUND OF THE INVENTION

The present invention is related to a magnetic bearing means for a rotor shaft having radially and possibly axially restoring magnetic forces in the event of a deflection of the rotor shaft from a reference position. One such magnetic bearing means is disclosed in U.S. Pat. No. 5,196,748.

Magnetic bearings allow moving parts to be provided with contactless and non-wearing bearings. They need no lubrication and can be designed for low friction. With such an arrangement, a rotor body can be insulated from the surrounding environment hermetically, i.e., in a vacuum-tight manner.

Conventional magnetic bearings use magnetic forces between stationary electromagnets of a stator and ferromagnetic elements of a rotor body where those elements rotate with the rotor. The magnetic forces are always attracting forces in this type of bearing. As a result, in principle, no inherently stable bearing effect can be provided in all three spatial directions (cf. "Earnshaw's Theorem in "Transactions of the Cambridge Philosophical Society," Vol. 7, 1842, pp. 97–120). Therefore, such magnetic bearings require an active bearing regulation, which controls the currents of the bearing magnets via bearing sensors and a regulating circuit and counteracts the deviation of the rotor body from its reference position. The regulation, which must be of the multichannel type, requires complex and costly power electronics. In addition, a mechanical backup bearing must be provided against sudden failure of the regulating circuit. Such magnetic bearings are used, for example, in turbomolecular pumps, ultracentrifuges, high-speed spindles of machine tools and X-ray machines with rotating anodes; application with motors, generators, turbines and compressors is planned.

Superconductors make a new type of magnetic bearing possible; in this case, one of the bearing parts is formed of permanent magnetic elements, which, in the event of a position change as a result of changes in the field, induce field-neutralizing screening currents in the superconducting parts. The resulting forces can be repelling or attracting, but are always oriented so that they counteract any deviation from the reference position. Unlike conventional magnetic bearings, an inherently stable bearing effect can thus be achieved (cf. e.g. "Appl. Phys. Lett.," Vol. 53, No. 16, 1988, pp. 1554–1556). Compared to conventional magnetic bearings, no complex and interference-sensitive regulation is needed here; however, cooling of the superconducting material is required.

Such superconducting bearing parts can be one of the first fields of application for the metal oxide high-$T_c$ superconducting materials, known since 1987, such as those based on the Y-Ba-Cu-O substance system, cooled to about 77 K. with liquid nitrogen. To date, such materials have been obtained in solid form only as polycrystals.

In the bearing means of the aforementioned U.S. Pat. No. 5,196,748, a plurality of annular disk-shaped permanent magnetic elements, lying one behind the other in an axial direction, are attached to a rotor shaft. These elements are polarized so that, seen in the direction of the axis, alternating polarization is obtained. Relatively thinner metallic (shim) elements are arranged each time between each pair of adjacent elements. The primary objective of these intermediate elements is to spatially and magnetically separate the magnetic flux lines of the adjacent permanent magnetic elements, so that, at each intermediary element, a practically field-free gap is formed on the side of the element turned towards the air gap. The rotor body thus constructed is enclosed by a fixed-position, hollow cylinder-shaped structure made of high-$T_c$ superconducting material, such as $YBa_2Cu_3O_x$. This structure is kept at about 77 K. using liquid nitrogen ($LN_2$). The patent further discloses a rotor shaft made of a ferromagnetic material with a high permeability coefficient. It is recognized that thus the magnetic flux induced by the permanent magnetic elements mostly closes over this rotor shaft. The result is that the magnetic flux, exiting essentially at the separating line between the permanent magnetic elements and their respective allocated intermediate elements and interacting with the hollow cylindrical structure made of high-$T_c$ superconducting material, is weakened accordingly. Then there is the danger that the screening currents induced in the superconducting structure are too low for ensuring a stable bearing effect, especially for heavy rotor bodies.

Thus the problem is to provide a bearing means with the above-mentioned features so that this danger is no longer present. This must be an axially and radially inherently stable, contact-free and non-wearing, low-friction bearing means for a rotor shaft. The bearing capacity and rigidity must be sufficient for replacing mechanical bearings in machines such as motors, generators, pumps, centrifuges, flywheel energy storage devices, etc. In addition, it must have emergency operation features in the case of cooling failure.

SUMMARY OF THE INVENTION

This problem is solved according to the invention with a bearing element that comprises: a rotor body containing a first bearing part attached to the rotor shaft; a second, fixed-position bearing part surrounding said rotor body; one of the two bearing parts containing an arrangement of a plurality of alternately polarized permanent magnetic elements which are mutually set apart by intervening spaces, said spaces each being completely filled in by an intermediate element made of a ferromagnetic material; the other of the two bearing parts having a structure including high-$T_c$ superconducting material; the rotor shaft, in at least one tubular edge area facing the first bearing part, having a non-magnetic material; the ferromagnetic intermediate elements serving to concentrate the magnetic flux exiting from the permanent magnetic elements on the side facing the superconducting structure; the superconducting structure having grains made of the high-$T_c$ superconducting material, of which the majority each have an average grain size which is larger than at least the axial thickness of each of the permanent magnetic elements.

The present invention is based on recognizing the fact that the magnetic flux exiting from the permanent magnetic elements should be conducted mostly via the ferromagnetic elements, so as to obtain the advantage of a relatively high magnetic flux at the superconducting structure end of these ferromagnetic elements. This enhances the rigidity of the bearing. In this case, the magnetic bearing means functions at least as a radial bearing. Also advantageous is that only magnetic granular high-$T_c$ superconducting material needs to be provided for the bearing means. The magnetic properties of the superconducting material are determined by the circular current circulating within the crystal grains, which lead to an irreversible magnetization (cf., for example, DE-OS 38 25 710). Thus, problems of an unsatisfactory current transport across the crystalline grain boundaries are avoided. It was recognized that, to this end, the crystal grains must have a sufficiently large average grain size. In this case, the average grain size in the crystalline a–b planes of the high-$T_c$ superconducting is considered, which preferably should be oriented at least approximately parallel to the surface of the superconducting structure facing the bearing gap. Understood by the term "grain" (or, synonymously: "crystallite") is, in this case, a crystalline region of the superconducting material structure having uniform crystalline order, which, at its edge, forms grain boundaries with adjacent regions. The grain size or extent is indicated by the average diameter of the individual grain in a plane cutting.

According to one embodiment of the bearing element, the first bearing part, which is attached to the rotor shaft, should contain the structure with the high-$T_c$ superconducting material. Such a refinement is especially advantageous when the bearing means is part of a generator or motor rotor with a chilled, normal-conducting or super-conducting winding, with the shaft also kept at low temperature. As a result of the lack of contact, no heat enters via the shaft.

According to another embodiment of the bearing element, longitudinally extended permanent magnetic elements with an alternating polarization as seen in the circumferential direction are provided in the direction of the shaft axis. With such a bearing element, a shaft can be radially supported, and thereby a rotating moment can be transferred without making contact. Such a refinement of the bearing element is therefore of particular advantage when a driving power is to be transferred via the shaft. That is, the bearing element possesses coupling properties. Advantageously, at the same time, the fixed-position bearing part surrounding the rotor body is built using the permanent magnetic elements. A similar embodiment is, however, also possible for the rotor body. The special bearing element with the permanent magnetic elements extended longitudinally in the axial direction can likewise be advantageously provided for a cooled shaft of a generator or motor rotor with a cooled winding.

In further refinements the bearing element includes at least one coolant channel for a coolant that cools the high $T_c$ superconducting material. Also the crystalline a–b planes of the superconducting material may be aligned approximately in parallel to the outer surface of the rotor body. The bearing element may also include a holding and centering means that supports the rotor shaft when the superconducting structure is not in the superconducting operating state.

BRIEF DESCRIPTION OF THE DRAWINGS

In order to fully describe the invention and in detail, reference is made to the following drawing figures.

In the Figures, corresponding parts are provided with the same reference numbers.

DETAILED DESCRIPTION

Figure 1:
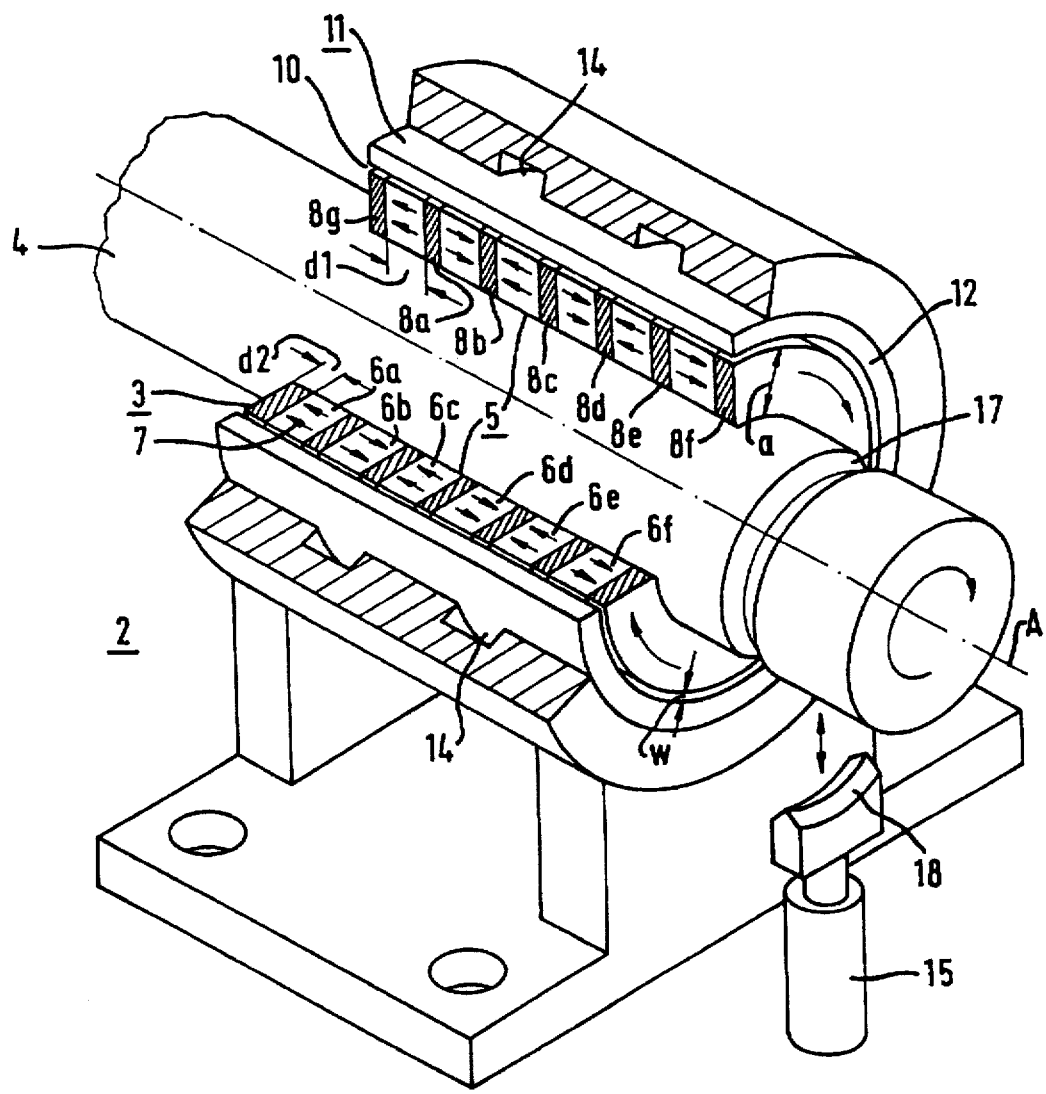
FIG. 1 illustrates an oblique view section of a first embodiment of a bearing element.

The bearing element shown in FIG. 1, generally designated with 2, is an embodiment based on rotor body 3 containing a first bearing part 5, attached to a rotating shaft 4 with a plurality, e.g., six annular disk-shaped permanent magnetic elements 6a through 6f. These elements are polarized so that, viewed in the direction of the shaft axis A, the polarization is opposite from one element to the next. The individual directions of polarization are shown in the figure by the arrows 7. Between the permanent magnetic elements 6a through 6f there are annular disk-shaped elements 8a through 8e, made of a ferromagnetic material such as iron. In addition, on the outer front surface of the outer permanent magnetic elements 6a through 6f, there are provided ferromagnetic elements 8f and 8g, corresponding to elements 8a through 8e. The ferromagnetic material of these elements 8a through 8g serves for concentrating the magnetic flux on the cylinder-shaped outer surface of rotor body 3 and thus enhances the carrying capacity of bearing means 2. Similarly, elements 8a through 8g also mechanically reinforce rotor body 3 with permanent magnetic elements 6a through 6f in general made of brittle material. All elements 6a through 6f and 8a through 8g are secured consecutively and stack-like to shaft 4. The shaft advantageously consists of a non-magnetic material such as a special steel.

The stack of permanent magnetic elements can, however, also be attached to a tubular support made of non-magnetic material, which in turn encloses a shaft part that may be made of ferromagnetic material. The wall thickness of the support, representing then a hollow cylindrical edge area of the shaft, must, in this case, be at least one-half of the axial thickness of the magnetic pole, i.e., (d1+d2)/2. In general, however, the entire rotor shaft consists of the non-magnetic material.

The outer contour of ferromagnetic elements 8a through 8g and possibly also of permanent magnetic elements 6a through 6f is made into an even cylindrical shape after stacking and securing, using, for example, gluing technology, for example by grinding or turning. The ferromagnetic material makes the magnetic field rotationally symmetrical, compensating for any non-homogeneity in the field of the permanent magnetic elements.

The permanent magnetic material of elements 6a through 6f should have a maximum energy product $(B* H)_{max}$ of at least 20 MGOe and should consist, in particular, of a neodymium(Nd)-iron(Fe)-bor(B)— or, possibly, of a samarium(Sm)-cobalt(Co) alloy.

The highest possible bearing pressure $P_m$, assuming an ideal super-conductor and a zero width of the bearing gap [air gap] (10) formed between the rotor body 3 and a stator surrounding it, amounts to: $P_m = \mu_o * H^2/2$. This bearing pressure is not pre-determined by the super-conducting material provided for the stator, but rather by the maximum attainable magnetic field H in the bearing gap 10. The relevant parameter for it is the coercive field strength $H_c$ of the permanent magnetic material. That is why NdFeB in particular is possible as permanent magnetic material, since it has a relatively high coercive field strength $H_c$. At 77 K., SmCo has a 10% higher coercive field strength $H_c$ than at room temperature, which is then comparable with that of NdFeB. Therefore, if necessary, a cooling of the permanent magnetic material may also be considered.

The radial dimension a of the annular disk-shaped permanent magnetic elements should advantageously be at least twice their thickness d1 in the axial direction. In turn, axial thickness d2 of each of ferromagnetic intermediate elements 8a through 8g is advantageously selected to be smaller than thickness d1; for example, thickness d2 can be 0.1–0.2 of thickness d1.

Figure 2:
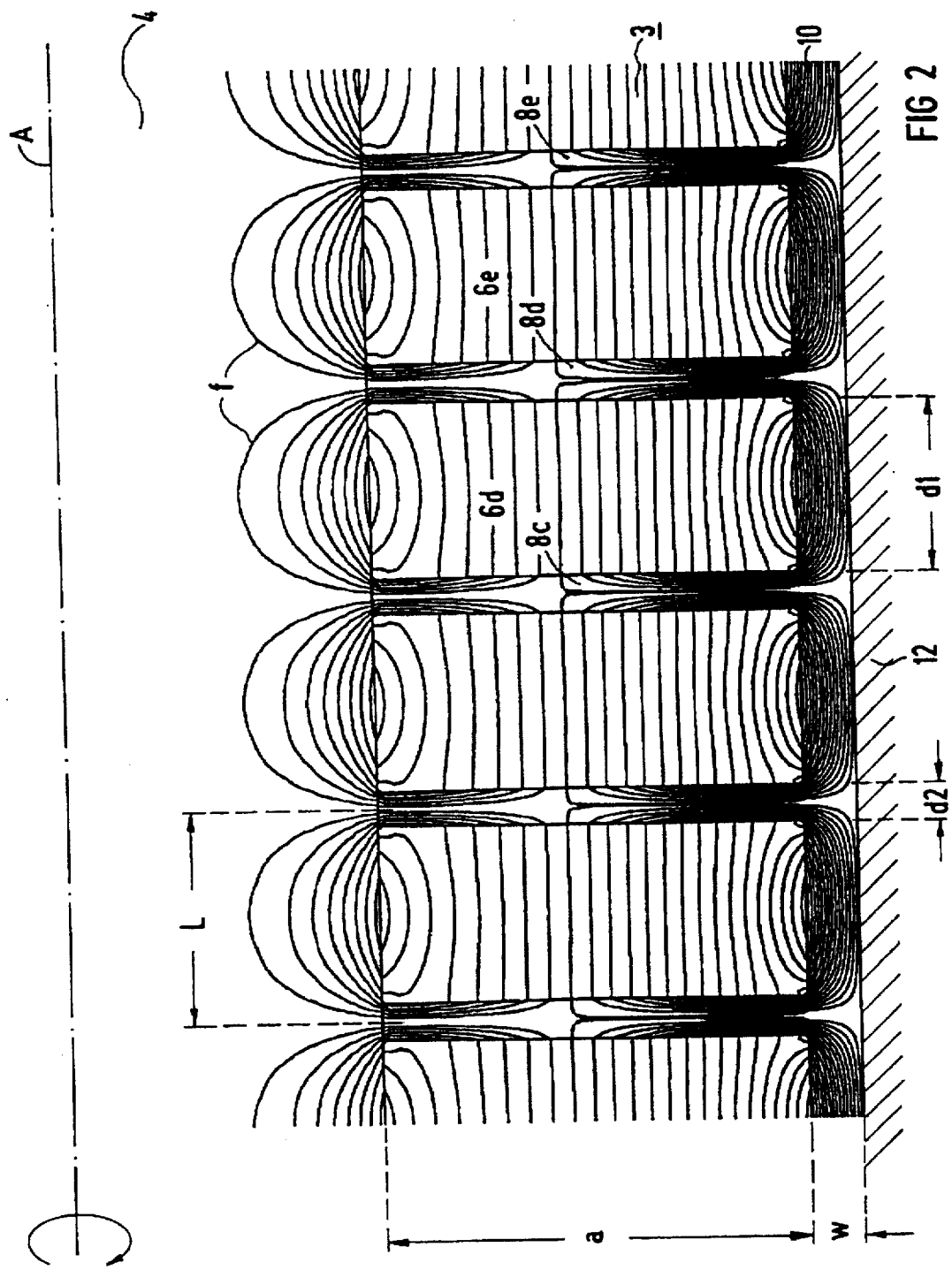
FIG. 2 shows the magnetic flux distribution characteristic in a section of this bearing means.

In a longitudinal cross-section through a section of the rotor body 3 according to FIG. 1, FIG. 2 shows the characteristic of the magnetic flux distribution f produced at the individual magnetic poles of the pole width L. As can be gathered from FIG. 2, the magnetic flux induced by the adjacent permanent magnetic elements (for example, 6d, 6e) is concentrated to a large extent in the shared ferromagnetic intermediate elements (8d), and thus exits with higher flux density via this intermediate element into the bearing gap 10 of the air gap width w. In this bearing gap, the flux closes toward each adjacent intermediate element (8c or 8e). A fixed-position, super-conducting structure which surrounds the rotor body 3 and borders the bearing gap 10, in which structure the magnetic flux produced by the individual magnetic poles induces corresponding currents, is designated with 12. On the side of the rotor shaft 4, the magnetic flux closes in the region of the non-magnetic material of the shaft. As a result, a magnetic short-circuit, which would otherwise lead to a reducing of the magnetic flux exiting into the bearing gap 10, is advantageously avoided there. For the flux distribution characteristic shown in FIG. 2, permanent magnetic elements made of NdFeB ($H_c \approx 9 \ast 10^5$ A/m) with an axial thickness d1 of 3.4 mm and a radial dimension a of 15 mm, besides intermediate elements made of soft iron with an axial thickness d2 of 0.6 mm, as well as an air gap width w of 0.4 mm were assumed. Moreover, the superconducting structure 12 had a critical current density $j_c$ in its crystallites (grains) of about $10^5 A/cm^2$.

The rotor body 3 is surrounded by a second, hollow cylinder-shaped fixed-position bearing part 11, separated by an air gap 10; the width of the air gap w is on the order of thickness d2 of ferromagnetic elements 8a through 8g. The bearing part 11, which constitutes the stator, has, on its inner surface facing rotor body 3, a superconducting material made of one of the known high-$T_c$ superconducting materials that allow $LN_2$ cooling technology.

A final grain size of the high-$T_c$ superconducting material crystallites and their critical current density, an imperfect crystal texture in the superconducting material, as well as a limited radial dimension of the permanent magnetic elements can limit the magnetic bearing forces. A maximum bearing capacity can only be achieved when the following two conditions prevail for the critical intragrain-current density (current density within the individual grains) $j_c$ of the superconducting material:

1) $j_c \gg H_c/L$

In this case, L is the pole width which is measured from the middle of a ferromagnetic intermediate element to the middle of the element adjacent to it. Therefore, it is: L=d1+d2.

2) The major portion of the crystal grains made of high-$T_c$ superconducting material, at least that portion approximately parallel to the surface of the superconducting structure 12 facing the bearing gap 10, should be larger in their average grain size than the thickness d1, preferably larger than the pole width L in the stack of permanent magnetic elements, so that the desired supercurrent pattern can be formed. Otherwise the superconducting material, and not the permanent magnetic material, limits the bearing capacity. Because of Condition 2), a high-$T_c$ superconducting material is provided advantageously for the bearing means according to the invention, in which the majority (that is, more than 50%) of the crystallites (grains), at least [that portion] approximately parallel to the bearing gap 10, have a dimension which is at least greater than the axial thickness d1 of the permanent magnetic elements.

Preferably, the dimension of the crystallites is greater than L=d1+d2.

In order to at least essentially fulfill the aforementioned conditions 1 and 2), textured $YBa_2Cu_3O_{7-x}$, in particular, may be considered as the superconducting material. Advantageously at the same time, the crystalline a–b planes of at least most of the superconducting material are oriented in a direction basically parallel to the outer surface of rotor body 3. Fine particles of $Y_2BaCuO_5$ can be advantageously present in the superconducting material. Such a material can be manufactured by the so-called Quench-Melt-Growth process (cf. "Supercond. Sci. Technol.," Vol. 5 1992, pp. 185–203) and should have a critical current density of a few $10^4$ A/cm$^2$ at 77 K. The average particle size (grain size)) of the crystallites should be larger than axial thickness d1 of the permanent magnetic elements, the particle size in the crystalline a–b planes being considered.

Figure 3:
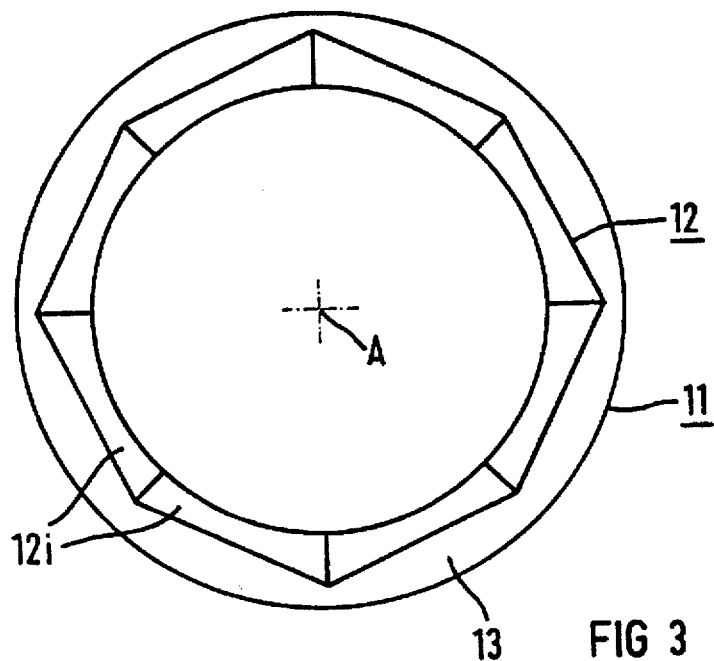
FIG. 3 shows a superconducting structure of the bearing of FIG. 1.

The superconducting part of bearing part 11 may consist, as shown in FIG. 3, of a plurality of sector-shaped hollow cylindrical parts in a support assembled into a structure 12 and shaped so that its inner contour forms the cylindrical form of bearing gap 10. In the cross section shown in the figure, eight sectors 12i (with $1 \leq i \leq 8$) made of high-$T_c$ superconducting material are provided as a stator. The crystallographic basal planes of the superconducting crystals are aligned within an angle of about ±30°, so that they are approximately parallel to the surface of bearing gap 10 in the individual sectors. Due to the high screening currents induced in the superconducting material over the ends of ferromagnetic intermediate elements 8a through 8g, the magnetic field does not penetrate deeply into the superconducting material and thus provides high bearing capacity and high rigidity of the bearing. The superconducting material is exposed to a relatively small alternating field amplitude ΔH when the rotor shaft rotates around its axis at a steady speed; this results in reduced magnetization losses P (=proportional to $\Delta H^3$) and thus in low bearing friction.

As further shown by FIG. 1, the superconducting material in sectors 12i is cooled on the outside of structure 12 via cooling channels 14 in support 13 with liquid nitrogen ($LN_2$) from an external storage container. A level alarm provides a shutoff signal when the coolant level drops below a pre-established threshold prior to any reduction in the bearing action due to warming.

Outside the rotor body 3 area, bearing means 2 has a lowerable holding and centering means 15, which takes up the bearing action at standstill, as long as the superconducting material is above its operating temperature. This bearing means lifts shaft 4 until the rotor body almost or fully contacts the superconducting structure 12 at a high point. At the same time, the bearing position is axially and laterally centered. This centering can be done, for example, as shown in FIG. 1, via a groove 17 in axis A and its knife-shaped support 18. After it has been cooled, the shaft is lowered by the device. Due to the ensuing change in the field in the superconducting material, currents are induced in this material. Thus an increasing electromagnetic force develops between the rotor body and the stator surrounding it, which acts in the opposite direction to that of the motion, until the rotor body is freely suspended approximately in the center of bearing gap 10. The magnetic forces have a repelling action in the lower portion of the bearing, while in the upper portion attraction forces are added. This is an advantage compared to prior art bearings, in which the rotor body is lowered from a greater distance and where only repelling forces are generated. With the bearing means of the invention, bearing pressures of up to 10 bar and a considerable rigidity of the bearing means against shifts of the rotor in radial and axial directions are achieved.

Figure 4:
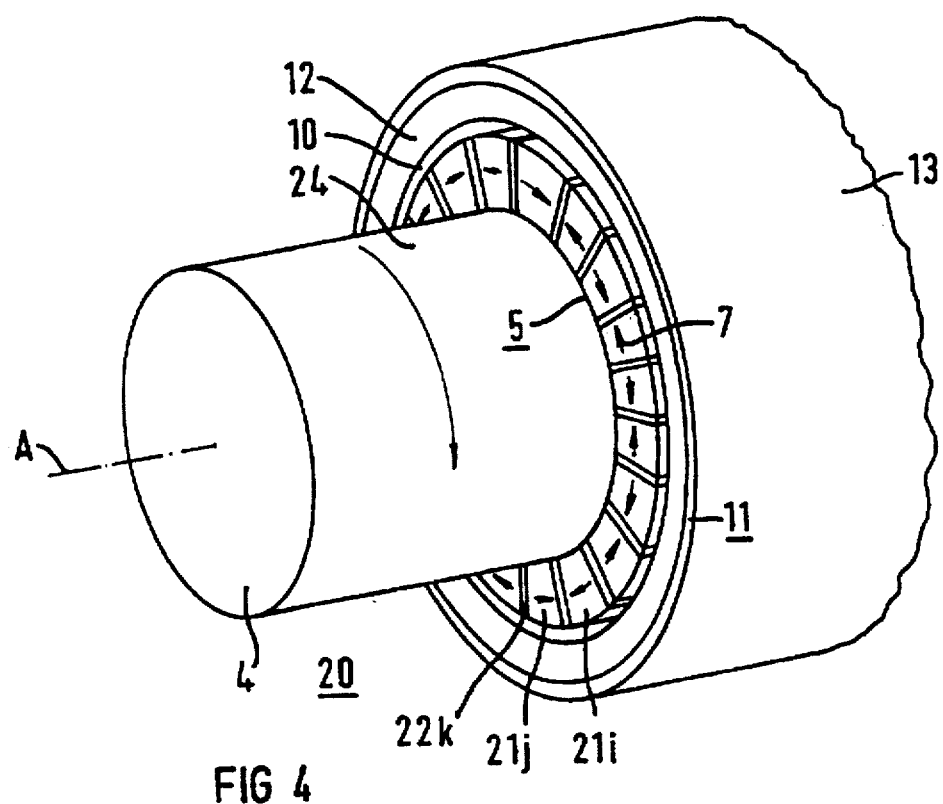
FIG. 4. illustrates an oblique view of another embodiment of a bearing element having rotating-moment-transfer coupling properties.

According to the embodiment shown in FIG. 1, a bearing element 2 is based on the fact that the magnetic forces are generated via permanent magnetic forces [sic] 6a through 6f, which surround shaft 4 in an annular shape. In the embodiment shown in FIG. 4 of another bearing means 20 of the present invention, alternatingly polarized permanent magnetic elements (viewed in the circumferential direction) 21i, 21j (with $1 \leq i \leq n$, $1 \leq j \leq n$) with ferromagnetic elements 22k (with $1 \leq k \leq 2n$) arranged between them are assembled in the form of stripes parallel to the axis into a hollow cylinder shape around shaft 4. The alternating polarization in the circumferential direction between adjacent permanent magnetic elements 21i and 21j is again shown in the figure by arrows 7. The warm rotor body 24 thus formed with first bearing part 5 made up by elements 21i, 21j, 22k is also surrounded by a cold second bearing part 11 with a superconducting hollow cylinder-shaped structure 12 and a support 13. Device 20 works as a radial bearing as well as a contact-free, magnetic coupling at the same time, that is, it can also transfer an axial rotating moment. As an example, a rotor with superconductive winding is possible with such a bearing on the drive side and with an axial/radial bearing as described above on the opposite side, rotating completely contact-free in a stator. A fine shell on the upper side of the superconducting structure 12 can be arranged in a possibly vacuum-tight casing in order to provide thermal insulation to the surrounding environment.

Figure 5:
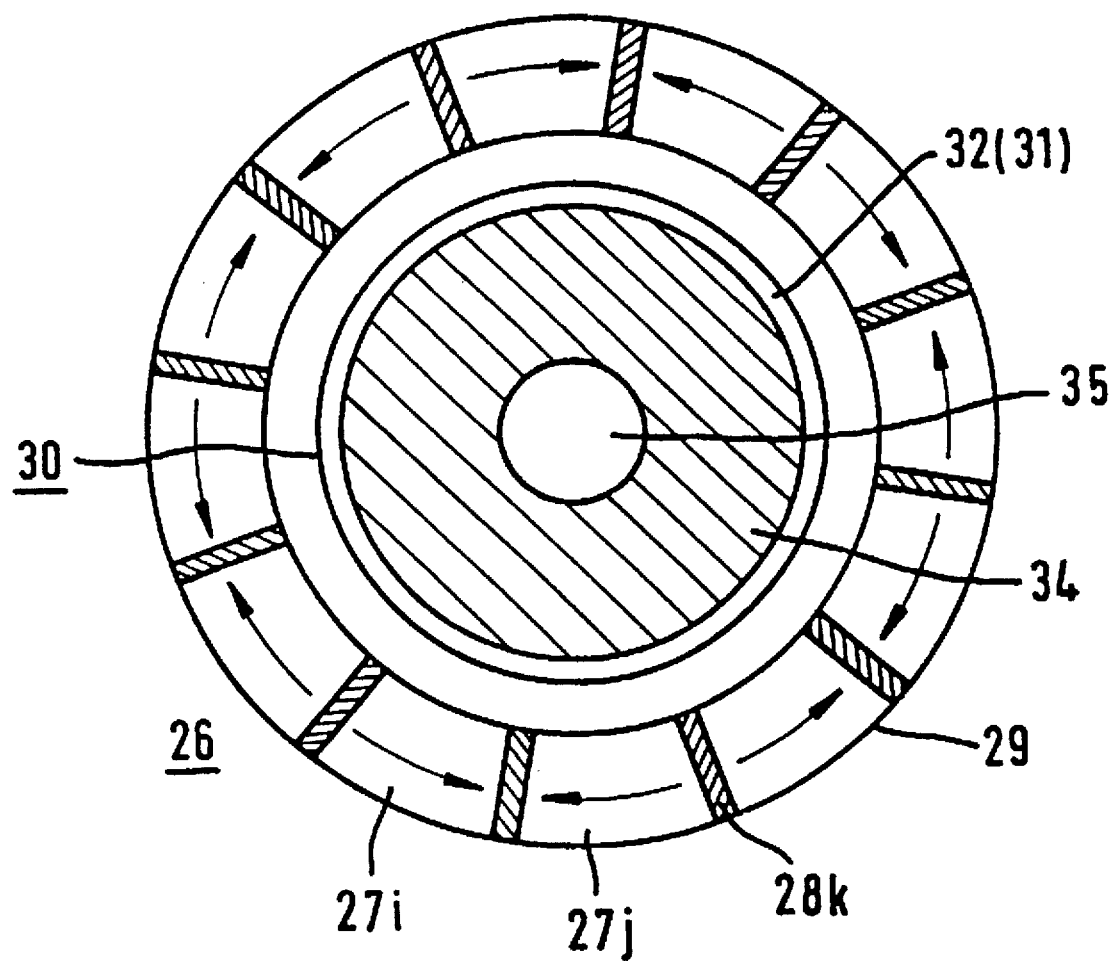
FIG. 5. shows a cross section of another embodiment of a bearing element having coupling properties.

In the embodiments shown in FIGS. 1 through 4 of bearing elements 2 and 20 of the invention it was assumed that the warm (first) bearing part is integrated in a rotor body 3 and 24, respectively, which is surrounded by a fixed-position cold (second) bearing part (stator). It is also possible to have the cold bearing part rotate together with the high-$T_c$ superconducting material and to build the warm bearing part with the permanent magnetic material as a stator. Furthermore, in such an embodiment of a bearing elements, annular disk-shaped paramagnetic elements (as in FIG. 1) or axial permanent magnetic elements (as in FIG. 3) can be provided. FIG. 5 shows an embodiment of a bearing means 26 with such axial permanent magnetic elements 27i, 27j (with $1 \leq i \leq j$; $1 \leq j \leq n$). These elements are spaced by stripe-type elements 28k (with $1 \leq k \leq 2n$) made of ferromagnetic material and form with the latter a fixed-position hollow-cylindrical (second) bearing part 29. This bearing part encloses a rotor body 30 with the other (first) bearing part 31, which contains a hollow cylindrical superconducting structure 32 with the high-$T_c$ superconducting material. In this embodiment rotor shaft 34 made of non-magnetic material may have at least one, in particular central, coolant channel 35. Such bearing means with cold rotor body can advantageously be parts of a generator or motor rotor with high-$T_c$ superconducting material winding with the shaft also kept at a low temperature. Due to the lack of contact, no heat enters via the shaft.

What is claimed is:

1. A magnetic bearing element for a rotor shaft having radially restoring magnetic forces in the event of a deflection of the rotor shaft from a reference position, said element comprising:

a) a rotor body containing a first bearing part attached to the rotor shaft;

b) a second, fixed-position bearing part surrounding said rotor body;

c) one of the two bearing parts containing an arrangement of a plurality of alternately and axially polarized permanent magnetic elements which are mutually set apart by intervening spaces, said spaces each being completely filled in by an intermediate element made of a ferromagnetic material;

d) the other of the two bearing parts having a structure including high-$T_c$ superconducting material;

e) the rotor shaft, in at least one tubular edge area facing the first bearing part, having a non-magnetic material;

f) the ferromagnetic intermediate elements serving to concentrate the magnetic flux exiting from the permanent magnetic elements on the side facing the superconducting structure;

g) the superconducting structure having grains made of the high-$T_c$ superconducting material, of which the majority each have an average grain size which is larger than at least the axial thickness of each of the permanent magnetic elements.

2. The element of claim 1, wherein the average grain size of the grains made of the high-$T_c$ superconducting material is larger respectively than the sum of the axial thickness of a permanent magnetic element and the axial thickness of a ferromagnetic intermediate element.

3. The element of claim 1, wherein the first bearing part attached to the rotor shaft contains the arrangement of permanent magnetic elements.

4. The element of claim 2, wherein the first bearing part attached to the rotor shaft contains the arrangement of permanent magnetic elements.

5. The element of claim 1, wherein the first bearing part attached to the rotor shaft contains the structure with the high-$T_c$ superconducting material.

6. The element of claim 2, wherein the first bearing part attached to the rotor shaft contains the structure with the high-$T_c$ superconducting material.

7. The element of claim 5, further including at least one coolant channel for the coolant that cools the high-$T_c$ superconducting material being provided in the rotor shaft.

8. The element of claim 1, further comprising a superconducting material, at least most of whose crystalline a–b planes are aligned approximately in parallel to the outer surface of the rotor body.

9. The element of claim 2, further comprising a superconducting material, at least most of whose crystalline a–b planes are aligned approximately in parallel to the outer surface of the rotor body.

10. The element of claim 3, further comprising a superconducting material, at least most of whose crystalline a–b planes are aligned approximately in parallel to the outer surface of the rotor body.

11. The element of claim 5, further comprising a superconducting material, at least most of whose crystalline a–b planes are aligned approximately in parallel to the outer surface of the rotor body.

12. The element of claim 1 wherein said permanent magnetic elements are arranged consecutively in the direction of the axis of the rotor shaft.

13. The element of claim 2 wherein said permanent magnetic elements are arranged consecutively in the direction of the axis of the rotor shaft.

14. The element of claim 3 wherein said permanent magnetic elements are arranged consecutively in the direction of the axis of the rotor shaft.

15. The element of claim 5 wherein said permanent magnetic elements are arranged consecutively in the direction of the axis of the rotor shaft.

16. The element of claim 8 wherein said permanent magnetic elements are arranged consecutively in the direction of the axis of the rotor shaft.

17. The element of claim 1, wherein said permanent magnetic elements longitudinally extend in the direction of the axis of the rotor shaft with an alternating polarization seen in the circumferential direction.

18. The element of claim 2, wherein said permanent magnetic elements longitudinally extend in the direction of the axis of the rotor shaft with an alternating polarization seen in the circumferential direction.

19. The element of claim 1, further comprising a holding and centering means supporting the rotor shaft when the superconducting structure is not in the superconducting operating state.

20. The element of claim 3, wherein said permanent magnetic elements longitudinally extend in the direction of the axis of the rotor shaft with an alternating polarization seen in the circumferential direction.

21. The element of claim 5, wherein said permanent magnetic elements longitudinally extend in the direction of the axis of the rotor shaft with an alternating polarization seen in the circumferential direction.

22. The element of claim 8, wherein said permanent magnetic elements longitudinally extend in the direction of the axis of the rotor shaft with an alternating polarization seen in the circumferential direction.

* * * * *